United States Patent
Benouali et al.

(10) Patent No.: US 8,776,536 B2
(45) Date of Patent: Jul. 15, 2014

(54) CONTROL PROCESS FOR AN EXPANSION VALVE

(75) Inventors: Jugurtha Benouali, Clamart (FR); Jin Ming Liu, Conflans Saint Honorine (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 234 days.

(21) Appl. No.: 13/225,098

(22) Filed: Sep. 2, 2011

(65) Prior Publication Data

US 2012/0102980 A1    May 3, 2012

(30) Foreign Application Priority Data

Sep. 2, 2010   (FR) ...................................... 10 03507

(51) Int. Cl.
*F25D 3/12*    (2006.01)
*F25B 41/06*    (2006.01)

(52) U.S. Cl.
CPC .......... *F25B 41/062* (2013.01); *F25B 2700/135* (2013.01); *F25B 2700/1931* (2013.01); *F25B 2600/2513* (2013.01); *F25B 2600/21* (2013.01); *F25B 2700/171* (2013.01); *F25B 2700/21172* (2013.01)
USPC ................................................ 62/56; 62/222

(58) Field of Classification Search
CPC .. F25B 1/00; F25B 2600/2513; F25B 41/062; F25B 41/04; F25B 41/06; F25B 2341/064
USPC ............................... 62/56, 222, 225, 210, 224
IPC .............. F25B 1/00, 2600/2513, 41/062, 41/04, F25B 41/06, 2341/064
See application file for complete search history.

(56) References Cited

U.S. PATENT DOCUMENTS

| | | | | |
|---|---|---|---|---|
| 3,023,591 | A | * | 3/1962 | Tilney .............................. 62/204 |
| 3,744,269 | A | * | 7/1973 | Oshima et al. ................... 62/212 |
| 7,775,057 | B2 | * | 8/2010 | VanderZee ....................... 62/222 |
| 2008/0307810 | A1 | * | 12/2008 | VanderZee ....................... 62/222 |

* cited by examiner

*Primary Examiner* — Mohammad M Ali
(74) *Attorney, Agent, or Firm* — Howard & Howard Attorneys PLLC

(57) ABSTRACT

Control process of an expansion valve (EXV) situated in an air conditioning circuit in which circulates and flows a coolant, with the air conditioning circuit comprising at least a compressor (CMP), a condenser (CND) and an evaporator (EVP), characterized in that this control process includes the following steps or stages: when overheating is less than a threshold value, opening of the expansion valve is governed by a static control, and when overheating is higher than the threshold value, opening of the expansion valve is governed by a dynamic control.

7 Claims, 4 Drawing Sheets

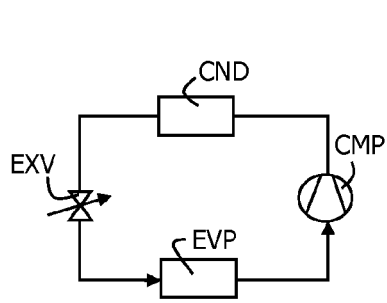
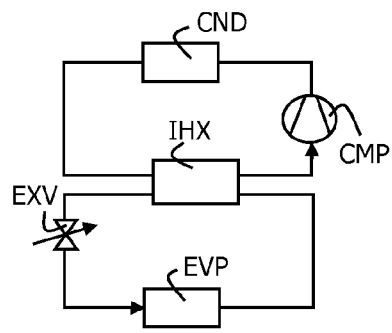
FIG.1a  FIG.1b
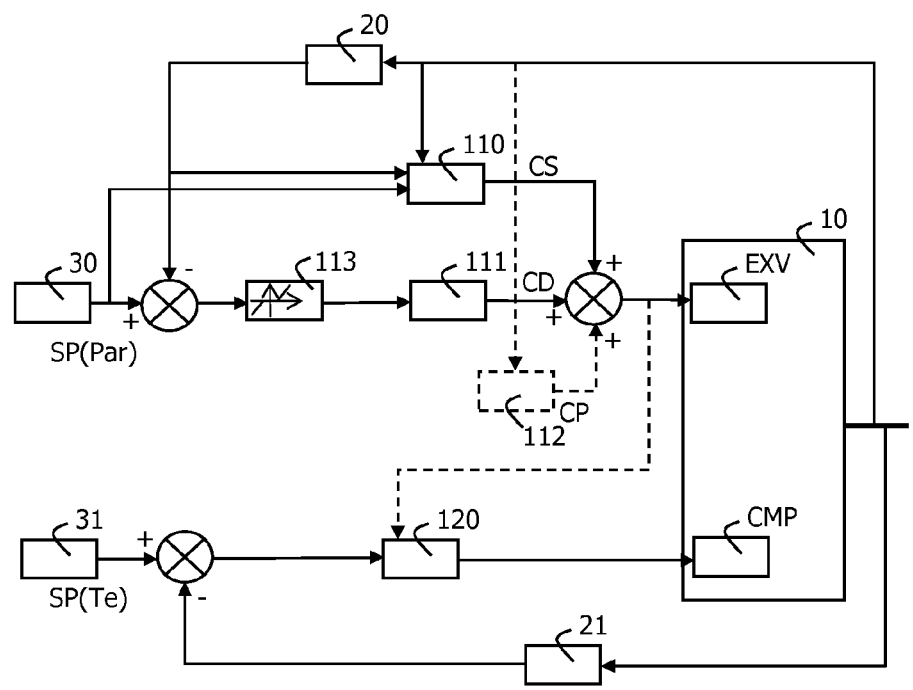
FIG.2

CONTROL PROCESS FOR AN EXPANSION VALVE

RELATED APPLICATIONS

This application claims priority to and all the advantages of French Patent Application No. FR 10/03507, filed on Sep. 2, 2010.

BACKGROUND OF THE INVENTION

This invention deals with the general domain of control processes of an expansion valve placed in an air conditioning circuit or loop in which circulates a sub-critical cooling fluid (R-134a, R-1234yf for instance). In general, such an air conditioning circuit includes at least a fixed or variable capacity compressor, an expansion valve, a condenser and an evaporator. Optionally, such an air conditioning circuit can include an internal heat exchanger between the high pressure and low pressure parts of the air conditioning circuit.

The invention deals more specifically with the strategy for controlling the expansion valve of an air conditioning circuit of an air conditioning system to be implemented in an automotive vehicle.

Control of the expansion valve opening enables to control overheating and under-cooling directly or indirectly so as to optimize the energy efficiency of the air conditioning circuit. Control of the expansion valve opening also permits to protect the air conditioning circuit from temperature and pressure peaks at the compressor outlet.

There are multiple solutions to control the expansion valve opening. According to these solutions, overheating, in other words, the difference in temperature at the evaporator outlet and the fluid saturation temperature, is controlled by using a derived integral proportional command. It is also possible to control the expansion valve opening on the basis of the temperature at the compressor outlet.

These solutions pose a problem for the weak thermal charges (for instance for outside temperatures below 25° C.). Indeed, it is very difficult to obtain overheating or under-cooling when the outside air temperature is below 25° C. Rather, one observes a temperature unbalance when exiting the evaporator and/or an increase in the system instability. In such case, checking the overheating does not make sense since this overheating is near the zero value.

If, on the other hand, a control of under-cooling is looked for at the inlet of the expansion valve, this cooling is also nearly zero during climate conditions showing an outside temperature below 25° C. for instance.

Consequently, the main purpose of this invention is to overcome the inconveniences or problems of the known systems by proposing a control process for an expansion valve situated on an air conditioning circuit in which a cooling fluid circulates, with the air conditioning circuit comprising at least a compressor, a condenser and an evaporator cooling, with this control process comprising the following steps:

when overheating is less than a threshold value, opening of the expansion valve is governed by a static control, and when the overheating is higher than the threshold value, opening of the expansion valve is governed by a dynamic control.

Consequently, with the invention, a static control of opening the expansion value is performed as soon as the overheating or the sub-cooling is near zero and thus difficult to control.

On the other hand, when the overheating or the sub-cooling is controllable, which corresponds to a difference between the temperature or pressure at the compressor outlet and a predetermined temperature or pressure threshold, higher than a predetermined elementary offset, if the parameter to control is higher than its set point value, the expansion valve is controlled dynamically on the basis of this parameter.

This way, the inconveniences of the systems of the state of the art, in which the absence of overheating or sub-cooling prevents an efficient control of the air conditioning circuit for controlling the opening of the expansion valve.

BRIEF SUMMARY OF THE INVENTION

According to a beneficial characteristic of the invention, the static control determines the value for opening the expansion valve, on the basis of a set point temperature, of a high pressure of the fluid, of an air temperature at the inlet of the evaporation and of a pulse air flow.

According to a preferred characteristic, the dynamic control determines the value for opening the expansion valve on the basis of a threshold value below which the fluid temperature and/or pressure oscillates inside the air conditioning circuit.

According to another characteristic, the variation of the expansion valve opening is a function of the compressor speed.

BRIEF DESCRIPTION OF THE SEVERAL VIEWS OF THE DRAWINGS

Other characteristics and benefits of this invention will be brought out from the description below, referenced to the attached drawings which show an example of embodiment without any limitations. On the figures:

FIGS. 1A and 1B show schematically two examples of thermal circuits in which the invention can be implemented;

FIG. 2 shows a functional diagram of the command/control of a steam compression thermal circuit comprising an expansion valve with variable opening;

DETAILED DESCRIPTION OF THE INVENTION

Figure 3:
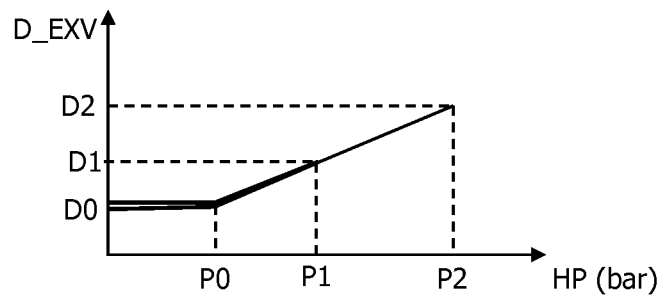
FIG. 3 shows a functional diagram of the opening size of the expansion valve on the basis of the pressure at the compressor outlet.

FIG. 1A represents a first example of the air conditioning circuit for which the invention can be implemented. This air condition circuit includes a compressor CMP; a condenser CND followed by an expansion valve EXP and an evaporator EVP.

FIG. 1B shows another example of the air conditioning circuit in which components identical to those of FIG. 1A are implemented. An internal heat exchanger (called IHX) permitting heat exchange between the fluid leaving the condenser and entering the expansion valve and the fluid leaving the evaporator and entering the compressor.

The invention involves the control of expansion valves as implemented in these two types of air conditioning circuits.

FIG. 2 shows a functional diagram of the command/control of a steam compression thermal circuit comprising an expansion valve with variable opening, and as an option, a variable sized or variable speed compressor (in the case of electric compressors).

A diagram of the circuit appears on FIG. 2, through reference 10, the expansion valve, through reference EXV, and the compressor, through reference CMP (said compressor can be of the mechanical or electric type).

Operation of the thermal circuit is continuously evaluated through measurements 20 performed at several points or locations of circuit 10. A temperature measurement 21 at the outlet of the evaporator is also made. These measurements enable a feedback on the parameters to be controlled during the operation of the thermal circuit.

In particular, the temperature at the outlet of the evaporator Te can be controlled with measurement 21 observed and calculation 31 of a set point value of this temperature at the outlet of evaporator Te. This feedback enables an action by a control unit of compressor 120 directly on the speed of compressor CMP.

In addition, another calculation 30 of a set point value SP (Par) of a parameter quantifying overheating or sub-cooling according to the invention, is used to determine a command signal of the expansion valve EXV by using measurements 20.

This signal includes several components according to the invention. Measurements 20 and calculation 30 of the set point value of the parameter quantifying the overheating are used within a static control unit 110 which calculates a component CS sent to expansion valve EXV.

A dynamic control unit 111 also determines a dynamic feedback component CD of the expansion valve control. This feedback is determined solely for predetermined intervals of the parameter and symbolized on FIG. 3 by reference 112 which symbolizes the presence of a—dead zone—of the parameter for which the feedback is not active.

According to a beneficial feature of the invention, the control system of the expansion valve also includes a control unit of the pressure peaks 112 using measurements 20 for determining and sending a component CP to expansion valve EXV.

Also beneficially, the command signal of the expansion valve is used by the control unit of compressor 120 to make a possible feedback for the speed of compressor CMP.

These last two features are represented by dotted lines on FIG. 2.

Within static control unit 110, opening of the expansion valve is determined on the basis of the pressures at the inlet and outlet of the compressor.

According to the invention, the control for the expansion valve opening depends on a static control and a dynamic control for opening. Indeed, when overheating approaches zero, a static control of the expansion valve opening is operated. Given that for outside temperatures below 25° C., overheating is practically zero and as such hard to control, the expansion valve operate as a tube orifice. In other words, below a certain overheating value, the expansion valve is maintained with a fixed diameter opening. When overheating exceeds a value threshold, a dynamic control of the expansion valve opening is then put in operation.

FIG. 3 shows a control curve of diameter D of the expansion valve, on the basis of the compressor outlet pressure. One observes that for pressures below a value P1, generally in the range of 8 to 12 bar, the size of the valve opening depends on high pressure HP and low pressure LP, while for pressures above P1, the size of the valve opening is linear on the basis of high pressure HP of the circuit. In addition, value P1 is the one from which a dynamic control of the expansion valve takes place. Indeed, when high pressure HP is below P1, the overheating value is too weak to be able to put into effect a dynamic control of the opening of the expansion valve. The static control of the expansion valve is then put into effect. As is shown on this figure, the opening diameter of the expansion valve evolves very little for high pressure values below P1.

In addition, when the air conditioning circuit is started up, with the low pressure undefined, the control process for opening the expansion valve uses a low pressure calculation on the basis of the set point value of the temperature at the evaporator outlet, the efficiency of the evaporator and the air temperature at this evaporator inlet.

In addition, below P1 and in particular below P0, the variation of the expansion valve opening must be very small and depends beneficially on the outside temperature, the air mass flow, the temperatures at the inlet and outlet of the evaporator and the air speed at the condenser. The greater the air mass flow, the larger the expansion valve diameter will be and the lower the temperature, the greater the expansion valve diameter. As such, these parameters can be used to evaluate the initial opening of the expansion valve and to put in place a dynamic feedback according to the invention.

Indeed, in order to implement the invention, it is necessary to make a calculation of a set point value for an overheating or under-cooling quantifying parameter. It is on this set point value that the derived integral proportional component will be calculated during the dynamic control of the expansion valve since the overheating or the under-cooling is found to be controllable.

Figure 4A:
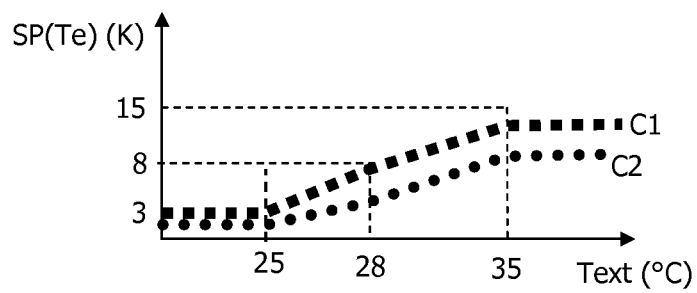
FIGS. 4A and 4B show the variation of a parameter quantifying the overheating on the basis of, respectively, the outside temperature and the high pressure at the compressor outlet.
Figure 4B:
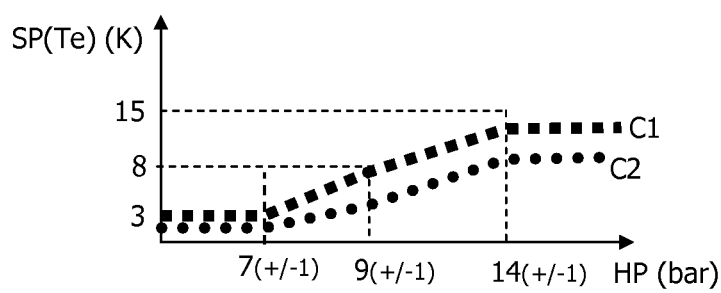

FIGS. 4A and 4B give two examples for establishing a set point value SP(Te) for the temperature parameter at the inlet to the compressor Te (or, consequently, at the outlet of the evaporator), on the basis respectively of the outside temperature Text and the high pressure HP, in other words, the pressure at the compressor outlet. This set point value SP (Te) is used for the static control.

FIG. 4A shows a first curve C1 which corresponds to determining the set point value ST(Te) in the case of an air conditioning circuit which operates with fresh air, while curve C2 corresponds to an air condition circuit operating on recycled air.

One observes that for an outside temperature below 25° C. or, for a compressor outlet pressure below 7 bar, there is no change in the set point value. This means that then one cannot speculate on overheating to optimize operation of the air conditioning circuit. The invention will be particularly useful in these areas of outside temperatures and pressure at the compressor outlet.

Figure 5:
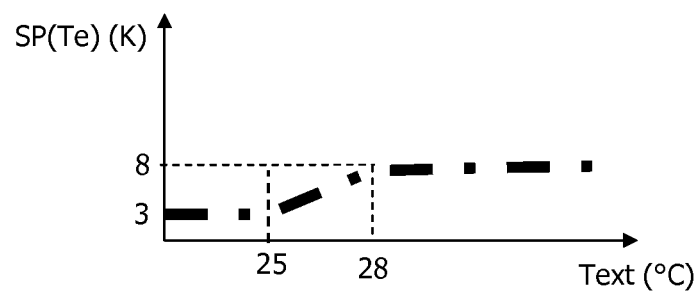
FIG. 5 shows a sub-cooling control profile on the basis of the outside temperature.

FIG. 5 represents schematically a curve determining a set point value SP(Te) for a sub-cooling quantifying parameter, for instance, here also, the evaporator outlet temperature.

Here also, one observes that for values below 25° C., it is no longer possible to optimize the performance of the air conditioning circuit by modifying the sub-cooling or overheating set point value.

Consequently, on the basis of FIGS. 4 and 5, one concludes that for outside temperatures below 25° C., the set point value cannot be set at 15 K for instance because the thermal charge is weak or even very weak and it is difficult to obtain high overheating or sub-cooling values without destabilizing the system.

Consequently, according to the invention, as soon as the difference between the compressor outlet temperature and the temperature threshold predetermined at 25° C. is higher than a predetermined elementary offset or as soon as the difference between the compressor outlet pressure and the pressure threshold predetermined at 7 bar is higher than a predetermined elementary offset and that the parameter is higher than the set point value, the expansion valve opening is controlled by a command signal comprising a component calculated by backfeed on the value of the parameter which quantifies overheating or under-cooling.

For that, the following measurements are made continuously during the operation of the air conditioning circuit: air flow passing through the evaporator, the target temperature of the pulsed air and of high pressure in the circuit. One observes here that the target temperature and the high pressure values are known with a certain margin of error.

Figure 6:
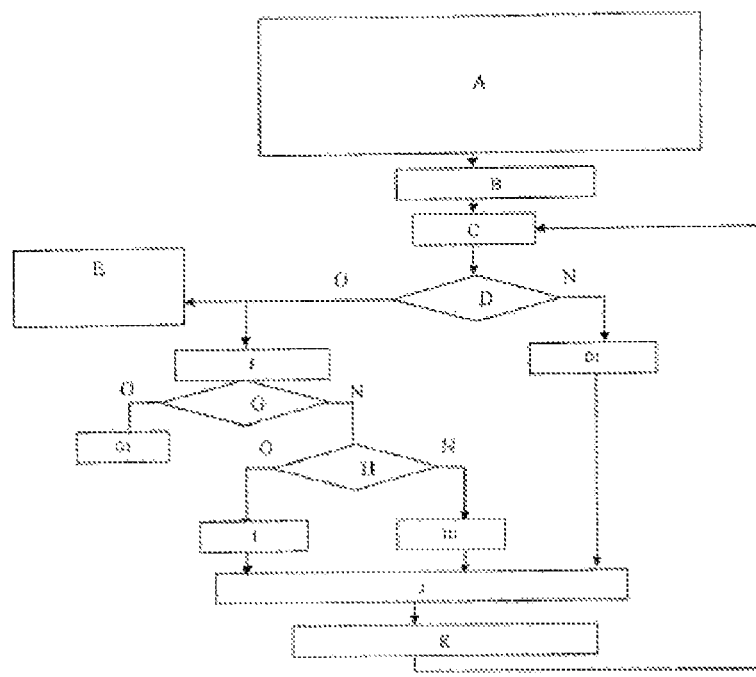
FIG. 6 shows an organizational diagram of the control of the expansion valve according to the invention.

FIG. 6 represents an organizational diagram for controlling the expansion valve opening of the invention. A stage A in which the parameters for the air conditioning circuit are collected, takes place. These parameters are for instance the air temperature at the evaporator inlet, the set point temperature, the high pressure value and the pulsed air flow. This is followed by a stage B in which the expansion valve opening is selected on the basis of the parameters collected during stage A. Stages A and B correspond to the static control of the expansion valve. As such, the expansion valve opening is set at a value D0. Here one observes that a circular section expansion value is considered but that the invention involves any other type of valve from the moment that the section of its opening is variable.

Initial value D0 is determined on the basis generally of high pressure HP and the outside temperature, of the progress speed and of the power of the motor-fan unit on the front, and possibly of the low pressure BP as we have seen before.

A stage C illustrates the progress in time over an increment corresponding to the duration of the period at which the expansion valve control signals are sent by a controller CNT.

A test stage D receives the measurements made for the air conditioning circuit and determines where there oscillations in the air conditioning circuit. In particular, this stage D analyses whether there are oscillations of low pressure, or high pressure, or of temperature at the evaporator outlet.

In the event that oscillations are observed (case O), in a stage E, the process stores the DN−1 opening value for the present expansion value in a register; this opening value is entered as DH. A stage F then permits to increase the opening value of the expansion valve by a value d1. Consequently, the expansion valve opening has a value DN=DN−1+d1. During a stage G, the process verifies whether the parameters of stage A have been modified. If the parameters have changed, a stage G1 permits upon opening the valve to adopt the value D0 defined during stage A. If the parameters of stage A remain unchanged during stage G, a stage H verifies whether the value DN is below or equal to the stored value DH of stage E for which the air conditioning circuit undergoes oscillations. If DN is less than or equal to the stored value DH during stage E, the opening value of the valve is then defined as follows: DN=DH+d1 during a stage I. This stage I permits to modify the opening of the expansion valve to stop the air conditioning circuit oscillations. According to a stage J, controller CNT receives the opening value DN of the valve to be sent to the expansion valve.

For stage H, if value DN is higher than value DH, the value DN is kept (stage H1) for opening the expansion valve since the oscillations no longer take place with such an opening. This value Dn is then transmitted to the controller for stage J.

A stage K illustrates the physical modification of the expansion valve opening. In other words, the command signal is sent by the controller to the expansion valve so that its opening can take the value recorded by the controller.

After stage K, the process goes back to stage C.

At stage D, if no oscillation has been detected, then the opening value for the expansion valve takes the value DN=DN−1−d1 during a stage D1. Then, this value is transmitted to the controller at stage J.

Please note that increment d1 for opening the expansion valve is beneficially calculated in the form of a derived integral proportional component.

Figure 7:
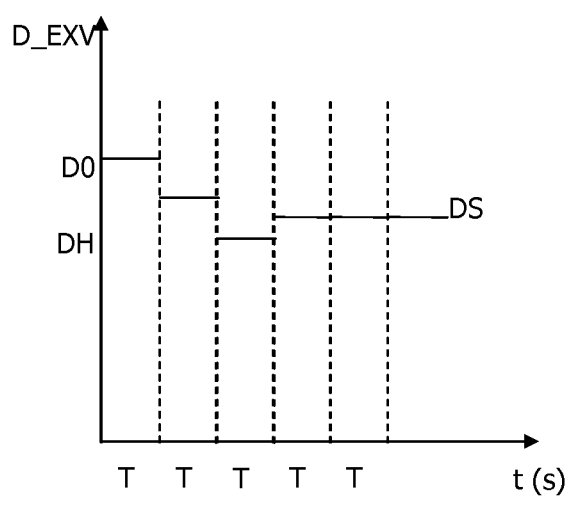
FIG. 7 shows the evolution of the expansion valve section on the basis of time as obtained with the process according to the invention.

FIG. 7 shows successive values of the command signal for diameter D_EXV of the expansion valve on the basis of time. One sees here that the opening value is modified for each period T. One sees also that the section of the expansion valve has diminished progressively over three levels with the absence of oscillation, then, when the DH value has been reached, it has been necessary to go up with a small increment d1. Diameter DS is found to be a stable value for opening the expansion valve under the conditions of operation then observed.

The invention permits also to be prepared for pressure peaks and drive couple peaks of the compressor, since the speed of said compressor varies greatly (in particular, acceleration) even while it is operating close to its maximum capacity.

Indeed, the invention allows that the size of the expansion valve opening is controlled on the basis of the compressor speed. Then, the compressor operates simultaneously with the static and dynamic control of the expansion valve opening.

Thus, the variation of the expansion valve opening is beneficially also a function of the compressor speed. Modification of the opening is determined to compensation the variation of the coolant flow due to the speed variation of the compressor.

Beneficially, the variation of the expansion valve opening on the basis of the compressor speed is effective from the time when the compressor has reached 75% of its maximum capacity.

Expansion valve control also allows to protect the air conditioning circuit against pressure or temperature peaks at the compressor outlet.

Opening of the expansion value is also controlled statically on the basis of pressure and temperature at the evaporator outlet since overheating or sub-cooling is near zero and dynamically when overheating our sub-cooling is controllable, in other words, when the temperature or pressure at the evaporator outlet exceeds threshold values; in this case, control is a function of the compressor speed when the compressor operates near its full capacity so as to compensate for the coolant flow rate variation.

Finally, please note that several implementations can be achieved according to the principles of the invention.

The invention claimed is:

1. A control process of an expansion valve (EXV) situated in an air conditioning circuit in which circulates and flows a coolant, with the air conditioning circuit comprising at least a compressor (CMP), a condenser (CND), and an evaporator (EVP), the control process comprising the following steps or stages:

when overheating is less than a threshold value, opening of the expansion valve is a fixed diameter opening governed by a static control that determines the value for opening the expansion valve, and when overheating is higher than the threshold value, opening of the expansion valve is a variable diameter opening governed by a dynamic control that determines the value for the opening the expansion valve.

2. The control process according to claim 1, in which the static control determines the opening value of the expansion valve on the basis of a set point temperature, of a high pressure of the fluid, of an air temperature at the evaporator inlet, and of a pulsed air flow.

3. The control process according to claim 1, in which the dynamic control determines the opening value of the expansion valve on the basis of a threshold value DH below which the temperature and/or pressure of the fluid oscillates inside the air conditioning circuit.

4. The control process according to claim 1, in which the variation of the expansion valve opening is a function of a speed of the compressor.

5. The control process according to claim 2, in which the dynamic control determines the opening value of the expansion valve on the basis of a threshold value DH below which the temperature and/or pressure of the fluid oscillates inside the air conditioning circuit.

6. The control process according to claim 2, in which the variation of the expansion valve opening is a function of a speed of the compressor.

7. The control process according to claim 3, in which the variation of the expansion valve opening is a function of a speed of the compressor.

* * * * *